United States Patent
Tischer et al.

(10) Patent No.: US 8,220,521 B2
(45) Date of Patent: Jul. 17, 2012

(54) DEVICE FOR DARKENING A CABIN WINDOW

(75) Inventors: Reinhard Tischer, Illertissen (DE); Erik Martinus Johannes van den Dolder, Eschbach (DE)

(73) Assignee: Diehl Aircabin GmbH, Laupheim/BRD (DE)

(*) Notice: Subject to any disclaimer, the term of this patent is extended or adjusted under 35 U.S.C. 154(b) by 148 days.

(21) Appl. No.: 12/616,409

(22) Filed: Nov. 11, 2009

(65) Prior Publication Data

US 2010/0126676 A1    May 27, 2010

(30) Foreign Application Priority Data

Nov. 22, 2008 (DE) .................. 10 2008 058 586
Jan. 30, 2009 (DE) .................. 10 2009 006 751
Mar. 18, 2009 (DE) .................. 20 2009 003 840 U (51) Int. Cl.
*A47G 5/02* (2006.01)
*E06B 3/32* (2006.01)
*A47H 1/00* (2006.01)
*A47H 5/00* (2006.01)

(52) U.S. Cl. .............. 160/310; 160/89; 160/90; 160/98; 160/84.06; 160/84.02

(58) Field of Classification Search .......... 160/89, 160/90, 98, 26, 33, 84.02, 84.06, 310, 168.1 P, 160/172 R, 239, 265, 267.1
See application file for complete search history.

(56) References Cited

U.S. PATENT DOCUMENTS

| 4,733,710 | A | * | 3/1988 | Haines | 160/84.06 |
| 4,775,039 | A | * | 10/1988 | Sunakawa | 477/11 |
| 5,082,043 | A | * | 1/1992 | Moreno | 160/90 |
| 5,477,904 | A | * | 12/1995 | Yang | 160/370.23 |
| 6,530,414 | B2 | * | 3/2003 | Mayr et al. | 160/98 |
| 6,571,851 | B1 | * | 6/2003 | Jelic et al. | 160/84.06 |
| 6,640,869 | B2 | * | 11/2003 | Ralph et al. | 160/90 |
| 6,915,988 | B2 | * | 7/2005 | Sanz et al. | 244/129.3 |
| 7,690,414 | B2 | * | 4/2010 | Knowles | 160/90 |
| 2001/0011580 | A1 | * | 8/2001 | Knowles | 160/84.02 |
| 2002/0053410 | A1 | * | 5/2002 | Mayr et al. | 160/98 |
| 2008/0148638 | A1 | * | 6/2008 | Knowles | 49/70 |
| 2009/0314439 | A1 | * | 12/2009 | Waters | 160/84.02 |

FOREIGN PATENT DOCUMENTS

| DE | 202 09 724 U1 | 6/2002 |
| DE | 20 2005 000 588 U1 | 1/2005 |
| EP | 1 939 389 A1 | 7/2008 |

* cited by examiner

*Primary Examiner* — Blair M Johnson
*Assistant Examiner* — Jaime F Cardenas-Garcia
(74) *Attorney, Agent, or Firm* — Scully, Scott, Murphy & Presser, P.C.

(57) ABSTRACT

A device for darkening a cabin window, with a drive shaft (11) for moving a first shading member (6), which is guided in two guide rails (3, 4), for to and fro movement, wherein the drive shaft (11) and the guide rails (3, 4) are combined in a common mounting unit.

17 Claims, 12 Drawing Sheets

DEVICE FOR DARKENING A CABIN WINDOW

BACKGROUND OF THE INVENTION

The invention relates to a device for darkening a cabin window, in particular a cabin window of an aircraft.

DISCUSSION OF THE PRIOR ART

According to the prior art, darkening devices for cabin windows of commercial aircraft are known in general. They generally involve plastic sliders which are guided frictionally in guide rails between an interior panelling and the cabin window.

The intensive light shining in through the cabin window can be only roughly shaded by the conventional darkening devices. Apart therefrom, the known darkening device requires a relatively high mounting outlay.

SUMMARY OF THE INVENTION

It is the object of the invention to eliminate the disadvantages from the prior art. The intention in particular is to provide a device which can be fitted as simply as possible for darkening a cabin window, with which device light that shines in can be shaded in as variable a manner as possible. According to a further aim of the invention, the device is to be provided with a pull-back device, which is designed as simply and cost-effectively as possible, for drawing back a shading means.

According to the invention, a device for darkening a cabin window is provided with a drive shaft for moving a first shading means, which is guided in two guide rails, to and fro, wherein the drive shaft and the guide rails are combined in a common mounting unit. This simplifies the mounting of the device. The first shading means provided according to the invention can preferably be rolled up and unrolled and is therefore designed such that it is flexible and thin-walled. It can be present in many different variants with regard to its light permeability.

According to an advantageous refinement, the mounting unit comprises a frame which is formed from the guide rails and an upper crosspiece and lower crosspiece connecting the guide rails. The provision of a frame increases the stability of the mounting unit. Weight can be saved by the guide rails being parts of the frame.

According to a further refinement, the mounting unit has a front wall attached to the frame and an opposite rear wall, wherein the front wall and the rear wall each have an aperture corresponding to the shape of the cabin window. By means of the provision of the front wall and the rear wall, the mounting unit is designed in the manner of a mounting cassette. A mounting cassette of this type is particularly robust and can be mounted particularly simply and easily.

According to a particularly advantageous refinement, a winding shaft which is driven by the drive shaft and is intended for rolling up and unrolling the first shading means, which is formed by a substantially rectangular blank, is provided. The provision of a winding shaft which differs from the drive shaft makes it possible to rotate the winding shaft at a rotational speed different from the drive shaft. In this case, given a constant rotational speed of the drive shaft, the winding shaft can also be rotated at a rotational speed which increases or decreases relative thereto.

The winding shaft is expediently designed as a hollow shaft and, with the interconnection of an elastic resetting means, is held rotatably on a drive shaft which is provided in the vicinity of first ends of the guide rails. The elastic resetting means can be a spring, preferably a torsion spring. The proposed refinement permits a rotational speed of the winding shaft differing from the rotational speed of the drive shaft during the rolling up and unrolling of the first shading means. Therefore, despite a winding radius which changes during the rolling up and unrolling, said rolling up and unrolling can be achieved at a constant speed.

According to a further refinement, a first drive strap which is provided for driving the drive shaft is fixedly connected to a first displacement bar, the ends of which are guided in the guide rails and to which an edge of the first shading means is attached. Within the meaning of the present invention, the term "drive strap" is understood in general as meaning a means for transmitting a torque. It may be a V-belt, a toothed belt, a flat belt, a chain or the like. Since the first displacement bar which is guided in the guide rails is fixedly connected to the first drive strap, a movement of the first drive strap causes a displacement of the first displacement bar along the guide rails. Therefore, the first shading means which is attached to the first displacement bar is moved simultaneously into a desired position.

The first drive strap is expediently guided about a first strap pulley, which is fixedly connected to the drive shaft, and about a second strap pulley provided in the region of one of the second ends of the guide rails. In this case, the second strap pulley can advantageously be optionally connected to a first electric motor via a first coupling in order to drive the first drive strap. Within the meaning of the present invention, the term "strap pulley" is understood as meaning a pulley corresponding to the respectively selected "drive strap". It may be a toothed belt pulley, a V-belt pulley, a flat belt pulley, a pinion or the like. The provision of a first coupling makes it possible to optionally decouple the first electric motor and therefore to displace the first displacement bar, for example, manually or with the special mechanical pull-back device. This enables the first shading means to be wound up even in cases in which the first electric motor does not function as a result of a power failure or defect.

The second strap pulley is expediently attached to a lower drive shaft which is driven by the first electric motor. The provision of a lower drive shaft makes it possible to accommodate the first electric motor away from the second strap pulley. A particularly compact construction of the device can therefore be achieved.

According to a particularly advantageous refinement, a pull-back device which is provided with a pretensionable spring and is intended for rolling up the first shading means is provided. A pull-back device of this type is expediently actuable manually. The mechanical configuration thereof means that it also functions in the event of a power failure. When the pull-back device is actuated, the shading means is completely rolled up because of the effect of the pretensioned spring and therefore the aperture is opened up.

According to a further advantageous refinement, the pull-back device comprises a pull-back shaft which can optionally be coupled into the lower drive shaft. The pull-back device can furthermore comprise a further torsion spring which is held on the pull-back shaft, and an optionally actuable blocking device for blocking a rotational movement of the pull-back shaft in the decoupled state. During manual operation of an actuating device which is provided for activating the pull-back device, the pull-back shaft is coupled into the lower drive shaft and the blocking device for blocking a rotational movement of the pull-back shaft is subsequently decoupled. As a result thereof, a force accumulated by the pretensioned, further torsion spring is released, thus causing the pull-back shaft and the lower drive shaft which is connected thereto to be rotated. The rotational movement of the lower drive shaft in turn rotates the winding shaft in one direction such that the first shading means is rolled up thereon. The proposed pull-back device has the advantage that the further torsion spring releases the accumulated force only when the pull-back device is released.

According to a further advantageous refinement of the invention, a towing slide is provided in at least one of the guide rails between the first displacement bar and the second end of the guide rail, and the towing slide can be drawn back in the direction of the first end of the guide rail by means of the pull-back device. The proposed pull-back device permits a movement of the towing slide in the direction of the first end of the guide rail. Since the towing slide is provided between the first displacement bar and the second end of the guide rail, the towing slide also draws the first displacement bar in the direction of the first end of the guide rail and therefore moves the first shading means back into its initial position. This can expediently take place by the first shading means being wound up onto the winding shaft. According to an advantageous refinement, a latching device for latching the towing slide in a latching position is provided in the vicinity of the second end of the guide rail. The spring may be a spring which can be pretensioned via a block and tackle. It is therefore possible to latch the towing slide in a prestressed state in the vicinity of the second end of the guide rail. When the latching is released, the towing slide is pulled back in the direction of the first end of the guide rail because of the action of the spring and therefore causes the first shading means to be set back into its initial position.

According to a further refinement, the guide rails are designed as double guide rails in which a second displacement bar is guided, to which displacement bar an edge of a second shading means folded in the manner of an accordion is attached. The light permeability of the second shading means expediently differs from that of the first shading means. The first shading means can be produced, for example, from a material which is substantially impermeable to light, and the second shading means can be produced from a material which is partially permeable to light. Since the aperture can therefore optionally be entirely or partially shaded by the first and/or the second shading means, a multiplicity of different shadings can be set.

In this case, the shading means may be produced from a woven fabric, a knitted fabric, a plastic reinforced with fibres or a woven fabric, or the like. Lightweight, UV-resistant materials which are hardly combustible or are non-combustible are preferred for producing the shading means.

In order to move the second displacement bar, at least one third strap pulley which is rotatable relative to the drive shaft and about which a second drive strap which is fixedly connected to the second displacement bar is guided can be provided on said drive shaft. Furthermore, a fourth strap pulley for driving the second drive strap can be provided in the region of one of the second ends of the double guide rails, said strap pulley being optionally connectable to a second electric motor via a second coupling. Similarly to the first electric motor, the second electric motor can be separated in terms of drive by means of the second coupling from the fourth strap pulley. This permits a manual movement of the second displacement bar or a movement of the second displacement bar by means of the pull-back device.

Furthermore, a release device for decoupling the first electric motor and/or the second electric motor is expediently provided. If both the first and the second shading means are provided, the first and the second electric motors can expediently be decoupled simultaneously with the release device. In the event of the release device being actuated, at least the first electric motor and the latching device, which keeps the towing slide in the latching position, can be decoupled simultaneously. The towing slide can therefore be released and therefore the first and, if appropriate, the second shading means can be moved back into a drawn-back initial position.

BRIEF DESCRIPTION OF THE DRAWINGS

The exemplary embodiments of the invention are explained in more detail below with reference to the drawings, in which.

DETAILED DESCRIPTION OF THE INVENTION

Figure 1:
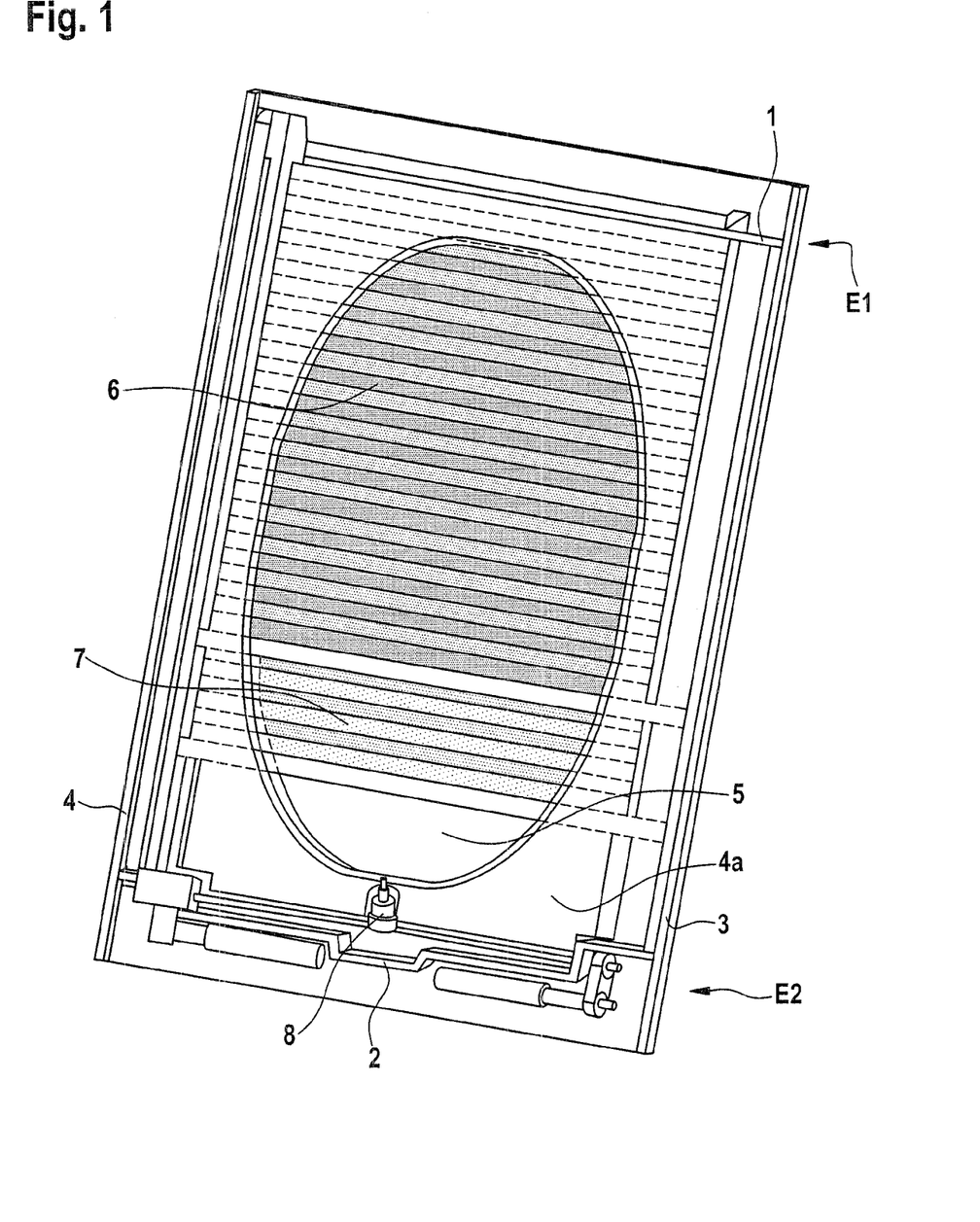
FIG. 1 shows a perspective view of the device according to the invention.

FIG. 1 shows a perspective view of a device according to the invention. The device is designed as a mounting unit or module. The mounting unit comprises a frame which is formed from two guide rails 3, 4 connected to each other by means of an upper crosspiece 1 and lower crosspiece 2. Each of the guide rails 3, 4 has a first end E1 in the vicinity of the upper crosspiece 1 and a second end E2 in the vicinity of the lower crosspiece 2. A front wall 4a and a rear wall arranged at a distance opposite thereto are attached to the frame. The front wall 4a and the rear wall each have an aperture 5, the shape of which corresponds to the shape of a cabin window (not shown here). A first shading means 6 and a second shading means 7 are guided displaceably between the front wall 4a and the rear wall. The first shading means 6 is substantially impermeable to light whereas the second shading means 7 is partially permeable to light. The first shading means 6 and the second shading means 7 are movable independently of each other. The aperture 5 can therefore be selectively shaded. The designation 8 refers to an actuating means for releasing a pull-back device.

Figure 2:
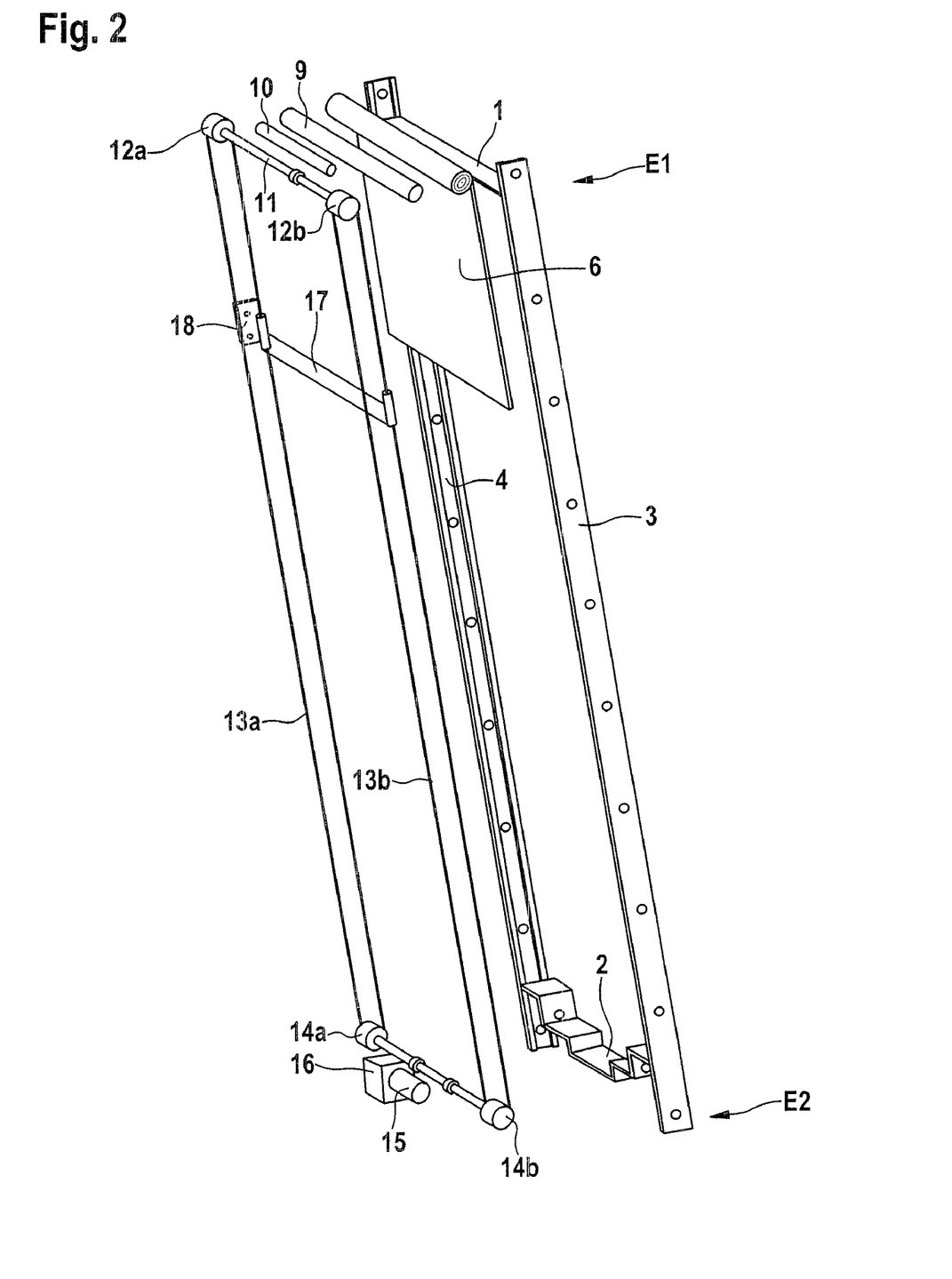
FIG. 2 shows a perspective view of the essential components of a first shading device.
Figure 3:
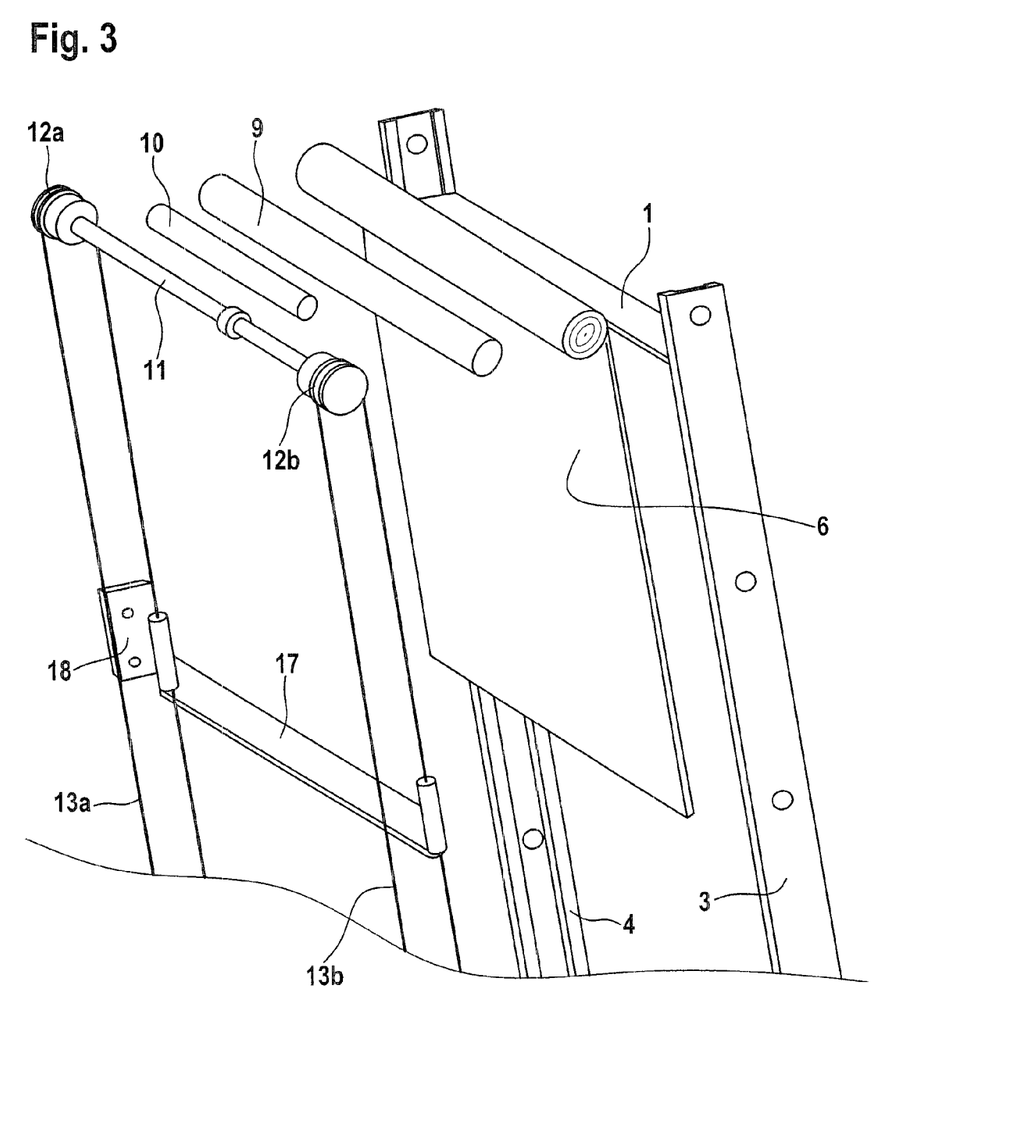
FIG. 3 shows a view of a detail as per FIG. 2.

FIGS. 2 and 3 show, in a perspective view, the essential components of a first shading device with which the first shading means 6 is movable to and fro along the guide rails 3, 4. A winding shaft 9 designed as a hollow shaft is provided for winding up the first shading means 6. The winding shaft 9 can be held on a drive shaft 11 with the interconnection of a torsion spring 10. The drive shaft 11 is provided with two first toothed belt pulleys 12a, 12b which are essentially fitted at the ends. The first toothed belt pulleys 12a, 12b are connected via first toothed belts 13a, 13b to second toothed belt pulleys 14a, 14b which are provided in the vicinity of second ends E2 of the guide rails 3, 4. The designation 15 refers to a first electric motor which can optionally be connected in terms of drive via a first coupling 16 at least to the second toothed belt pulley 14a.

A first displacement bar 17 is fixedly connected in each case to a rear strand of the revolving first toothed belts 13a, 13b. At both of its ends, the first displacement bar 17 is designed in such a manner that it is guided slideably in the guide rails 3, 4. A first guide means 18 can be provided at at least one of the two ends of the displacement bar 17.

Figure 4:
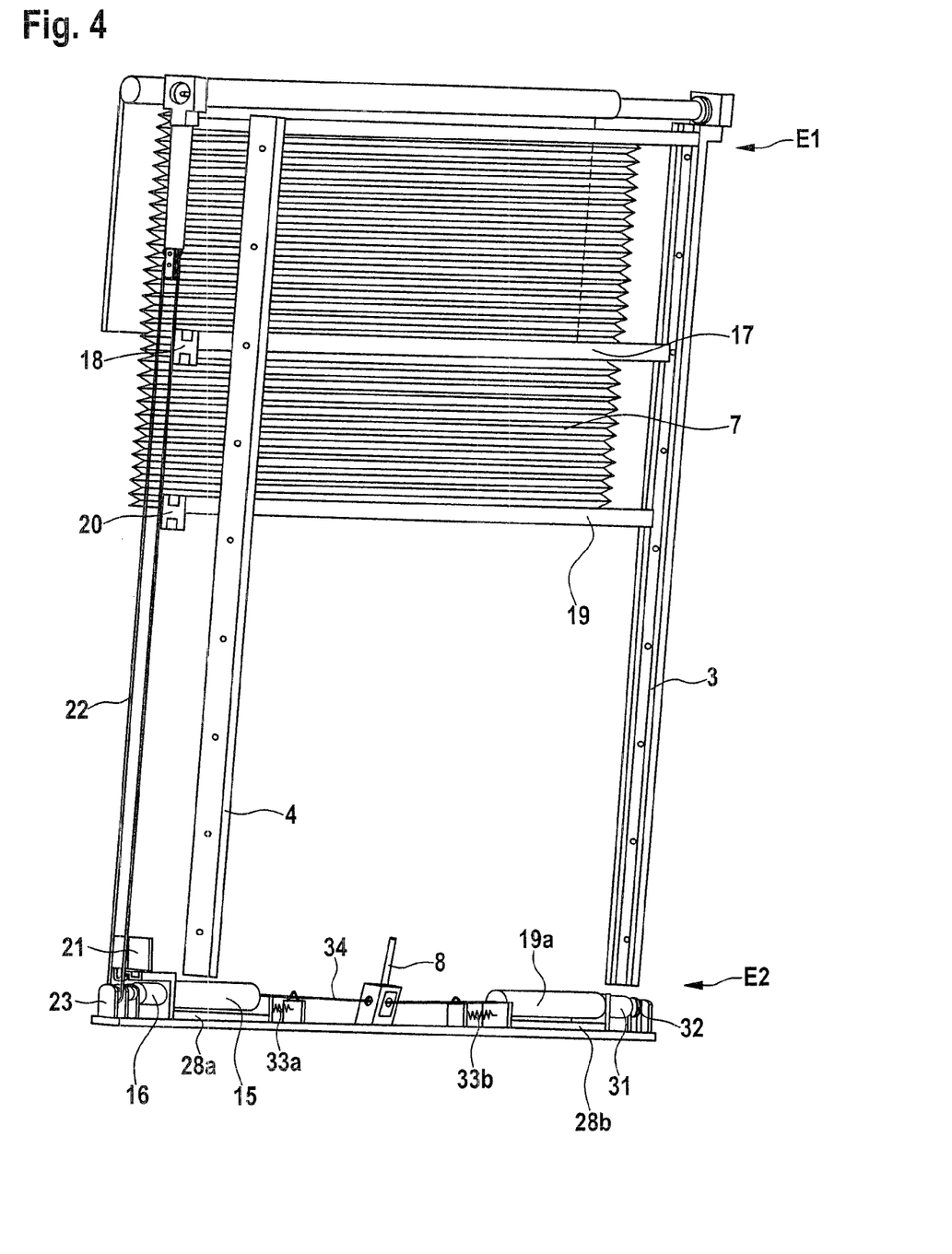
FIG. 4 shows a perspective view of essential components of the device together with the first and second shading devices.
Figure 5:
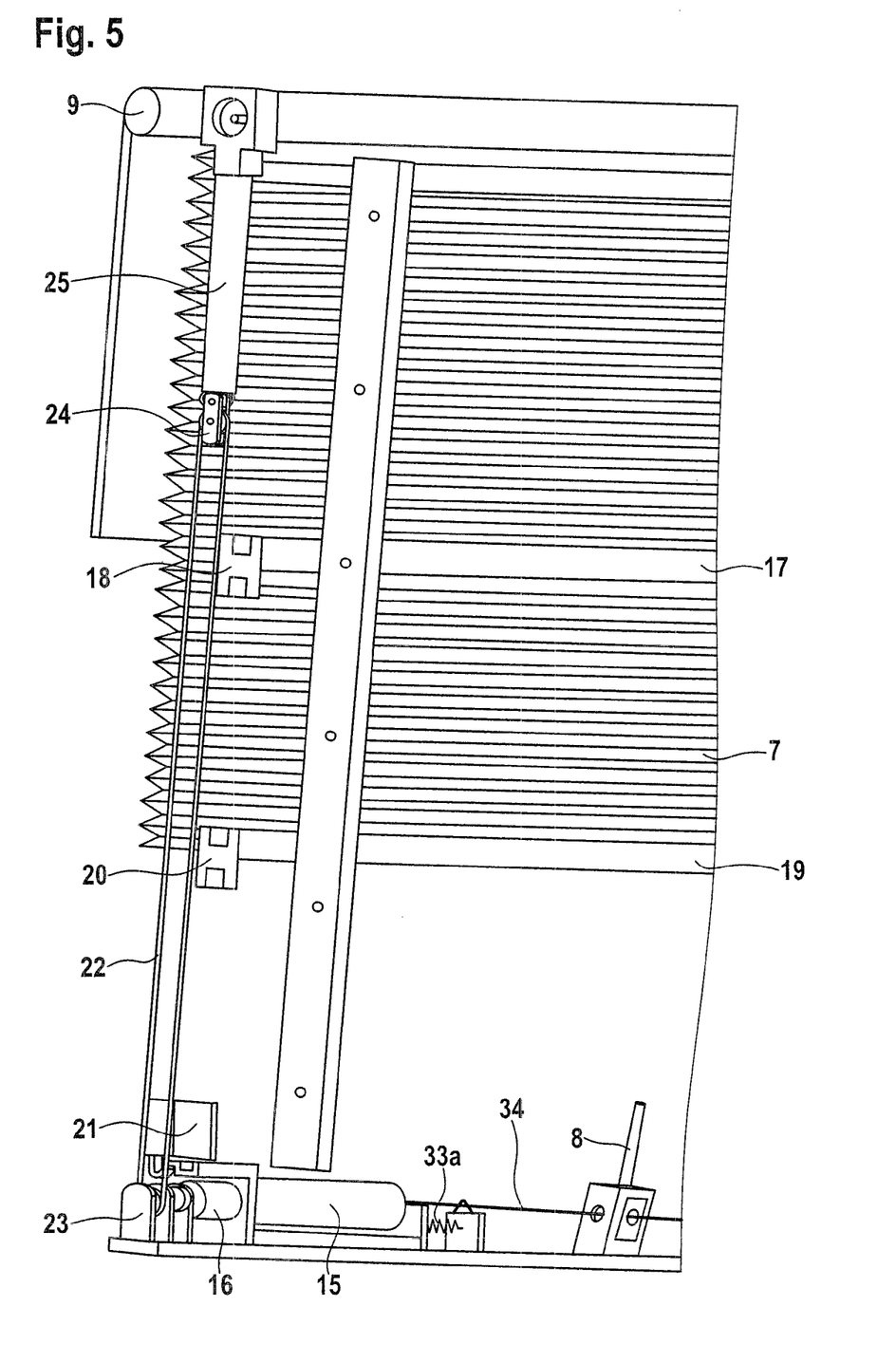
FIG. 5 shows a view of a detail as per FIG. 4.
Figure 7:
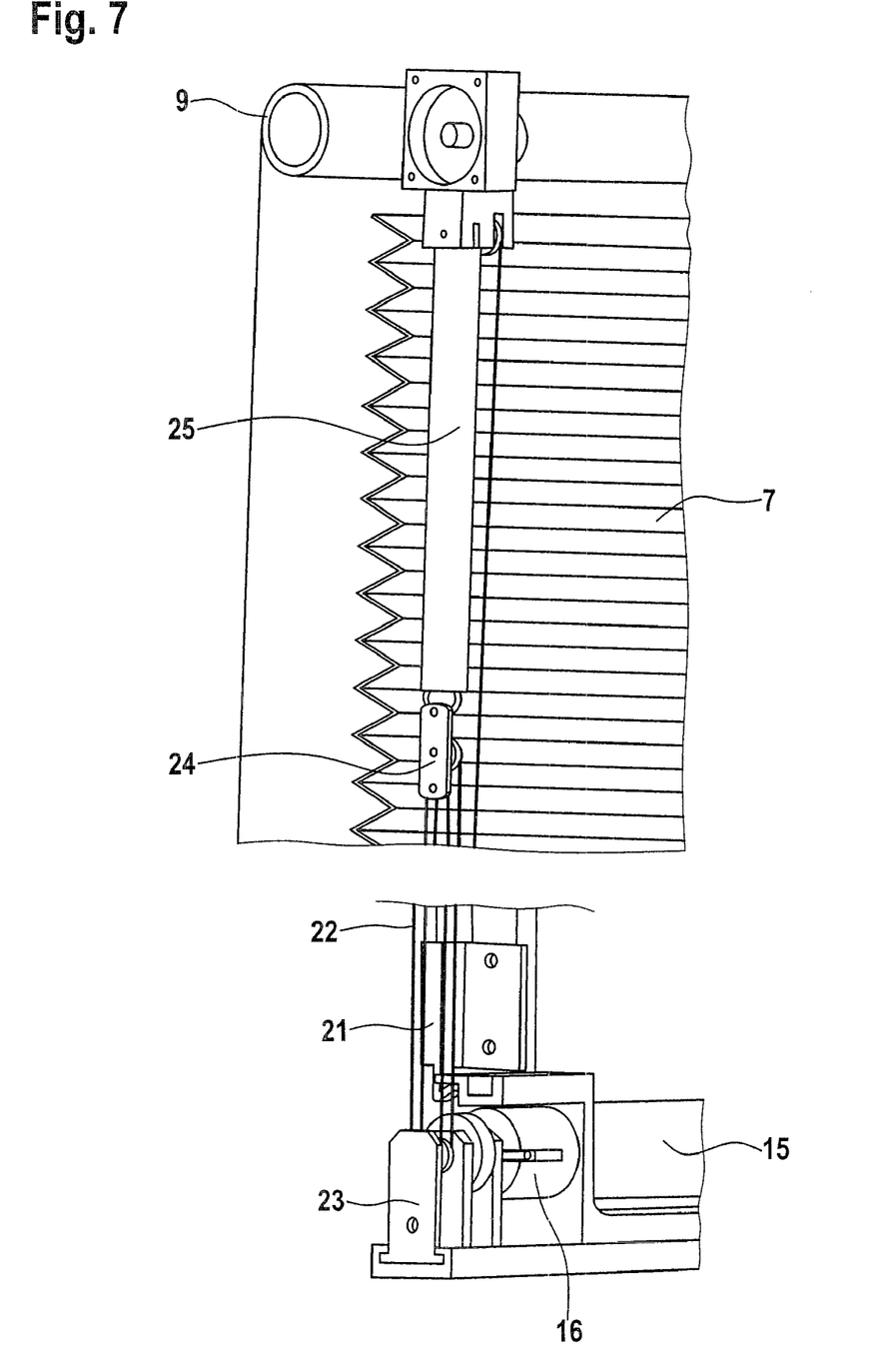
FIG. 7 shows a perspective view of essential components of a pull-back device.
Figure 8:
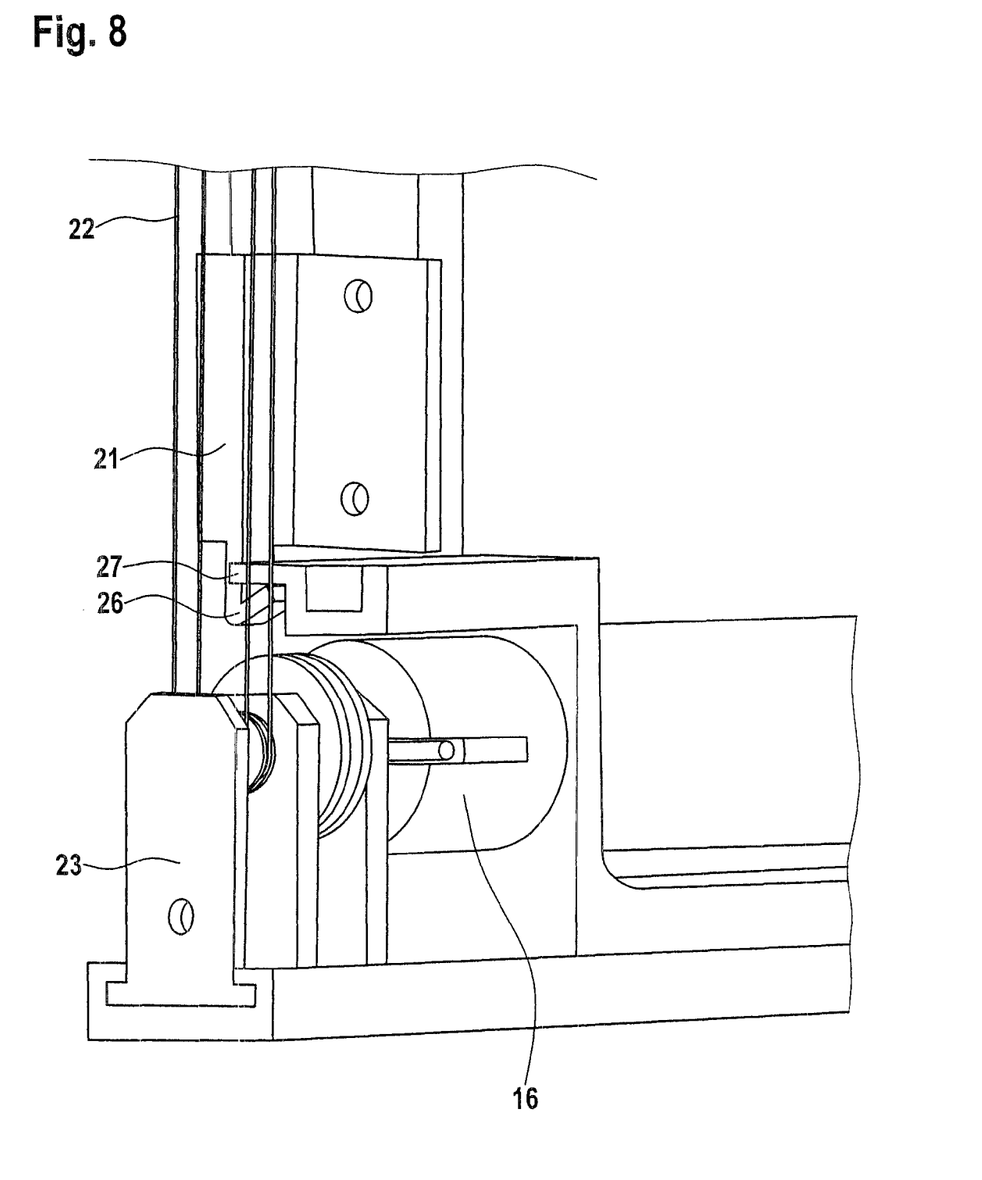
FIG. 8 shows a view of a detail as per FIG. 7.
Figure 9A:
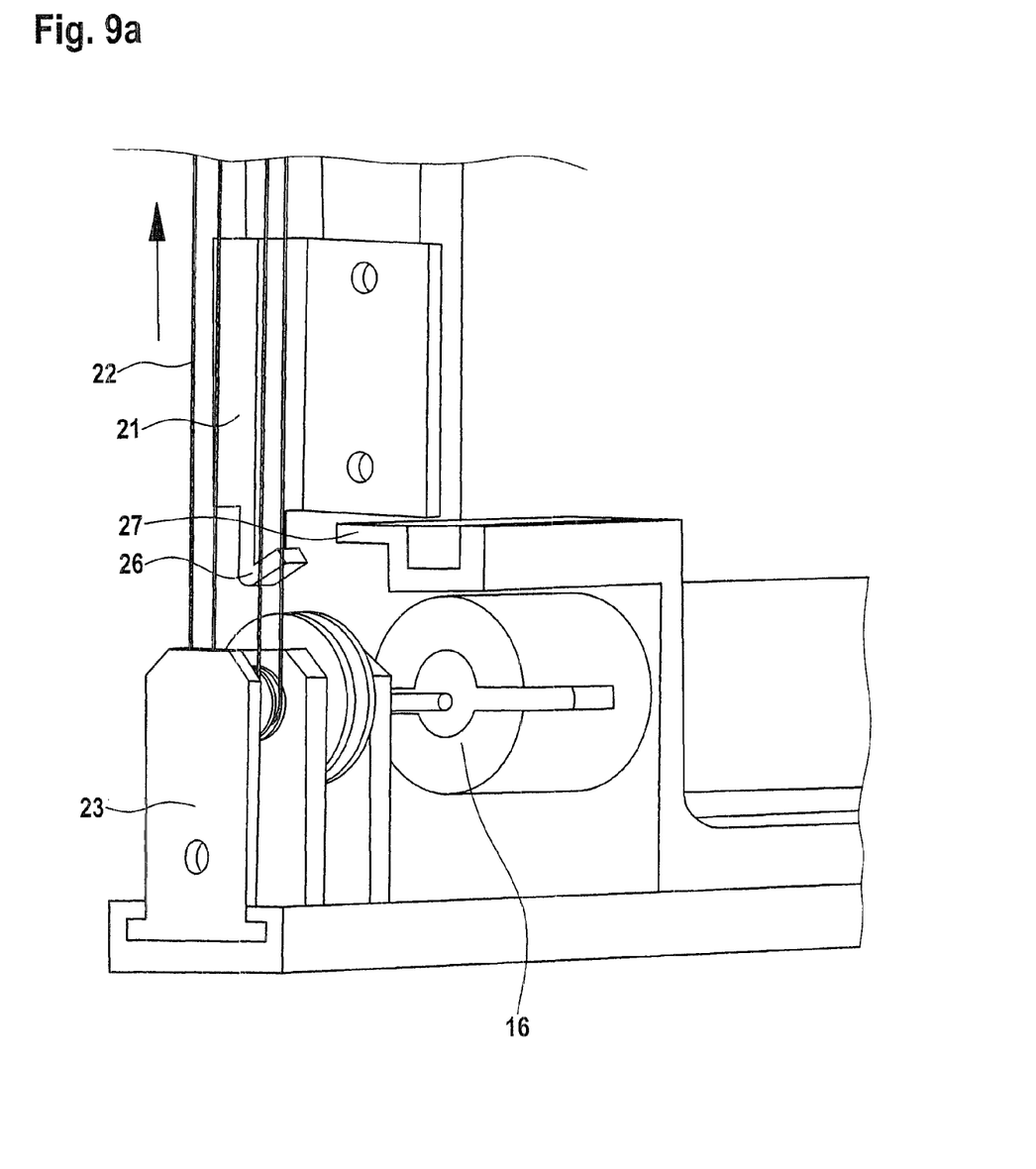
FIG. 9a shows the view of the detail as per FIG. 8 in the decoupled state.
Figure 9B:
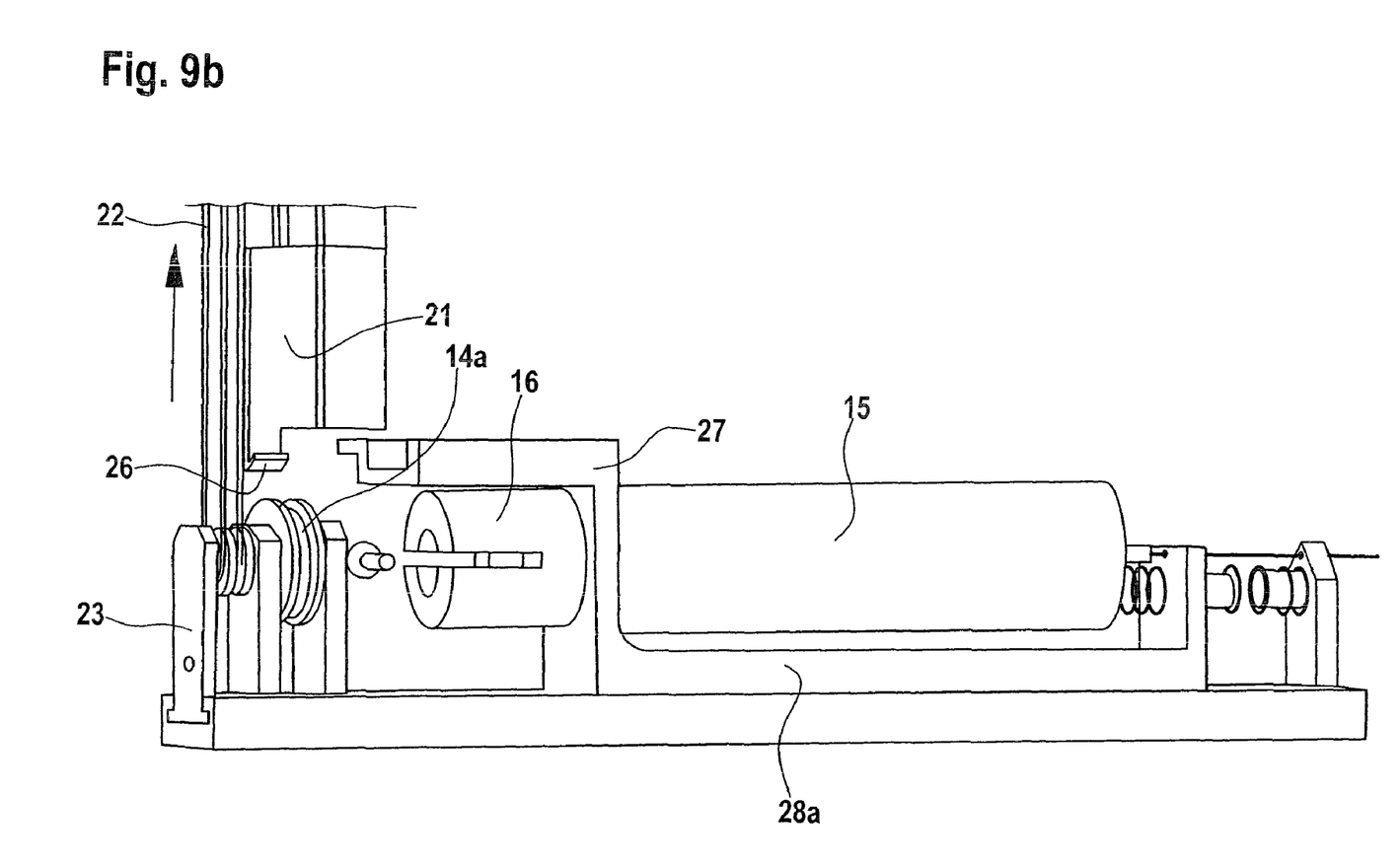
FIG. 9b shows a further perspective view of the decoupled state as per FIG. 9a, FIG. 10 shows a perspective view of essential components of a further pull-back device.

FIGS. 4, 5 and 7 show perspective views of the device as per FIGS. 2 and 3, with the essential components of a second shading device additionally being shown here. As is apparent in particular from FIG. 7, the second shading means 7 is a plissé folded in the manner of an accordion. The second shading means 7 is attached by an edge to a second displacement bar 19 which is likewise guided slideably in the guide rails 3, 4. For this purpose, the guide rails 3, 4 are each designed as double guide rails. The designation 19a refers to a second electric motor which is provided for driving a second toothed belt (not shown here) which, in a similar manner to the first toothed belts 13a, 13b, is fixedly connected to the second displacement bar 19. In a similar manner to the first displacement bar 17, the second displacement bar 19 can be provided at least at one end thereof with a second guide means 20.

The designation 21 refers to a towing slide which is connected to a tension spring device 25 via a block and tackle 22 with a lower block 23 and upper block 24.

FIGS. 7 to 9b show views of details as per FIG. 5. It can be seen in particular from FIGS. 8, 9a and 9b that the towing slide 21 has a latching claw 26 which interacts with a latching projection 27. The latching projection 27 is attached fixedly to a first motor slide 28a on which the first electric motor 15 is slideably held. As can be seen in particular from FIG. 4, the second electric motor 19a is also slideably held on a second motor slide 28b.

Figure 6:
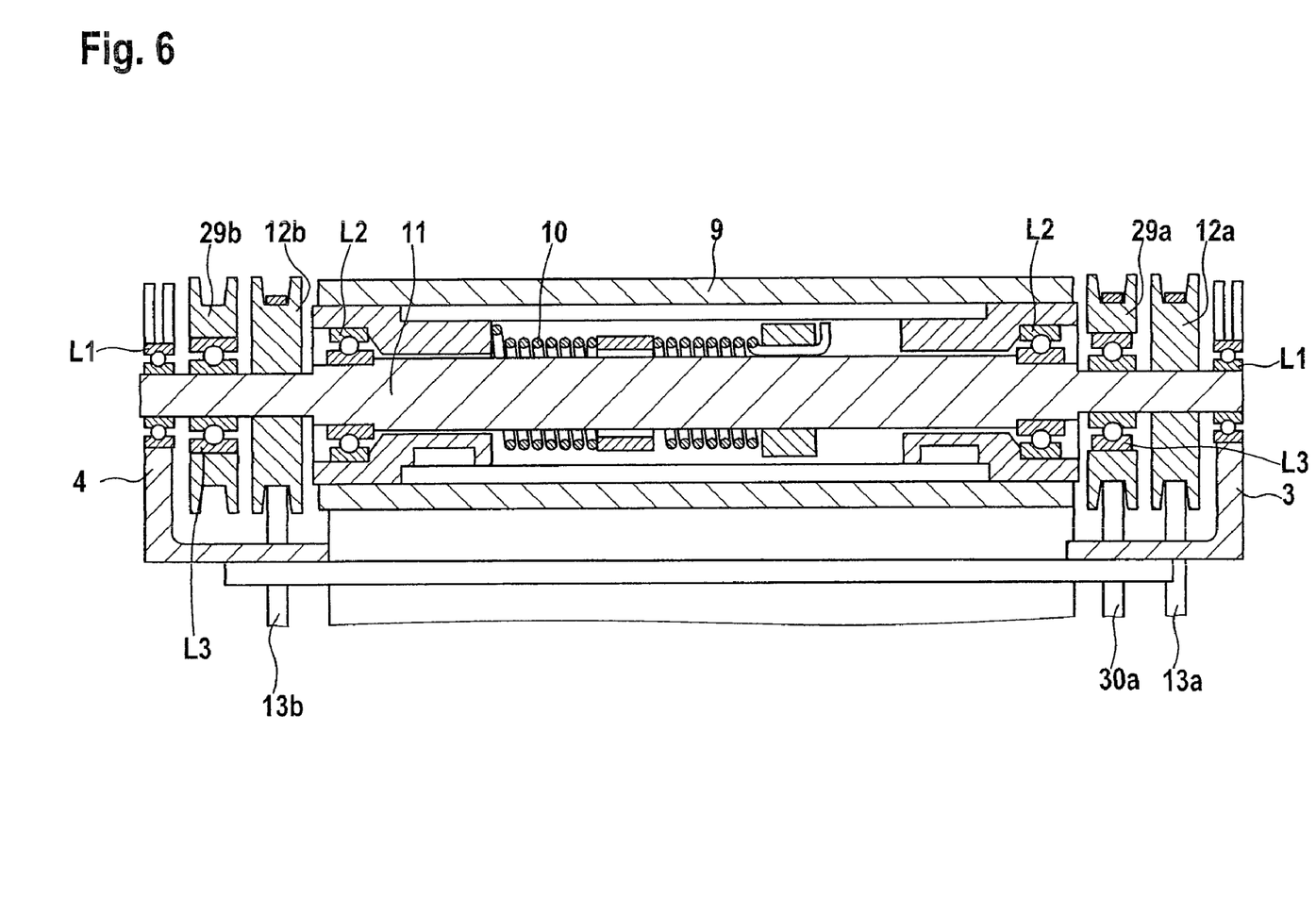
FIG. 6 shows a sectional view through the drive shaft of the device as per FIG. 4.

FIG. 6 shows a sectional view through the drive shaft 11. The drive shaft 11 is held rotatably by means of first ball bearings L1 in the guide rails 3, 4 which are arranged opposite each other. The first toothed belt pulleys 12a and 12b are fixedly connected to the drive shaft 11. The first toothed belts 13a, 13b are guided around the first toothed belt pulleys 12a, 12b. The winding shaft 9 is held rotatably on the drive shaft 11 by means of second bearings L2. The torsion spring 10 is attached on one side to the winding shaft 9 and on the other side to the drive shaft 11 such that a rotational movement at the winding shaft 9 relative to the drive shaft 11 always causes a torque.

The designations 29a, 29b refer to third toothed belt pulleys which are held rotatably on the drive shaft 11 by means of third bearings L3. Second toothed belts 30a, of which only one is shown here, are guided around the third toothed belt pulleys 29a, 29b. The second displacement bar 19 is attached to the second toothed belt 30a.

As can be seen in particular from FIG. 4, a fourth toothed belt pulley 32 which is connected via a second coupling 31 to the second electric motor 19a is provided in the vicinity of the second end E2 in order to receive the second toothed belt 30a (not shown here). The designations 33a and 33b refer to compression springs which force the motor slides 28a and 28b into a coupled-in position. A cable pull 34 which is actuable by the actuating means 8 connects the motor slides 28a and 28b. The motor slides 28a, 28b can therefore be moved in the direction of the actuating means counter to the action of the compression springs 33a, 33b and therefore the first coupling 16 and the second coupling 31 can be separated.

Figure 10:
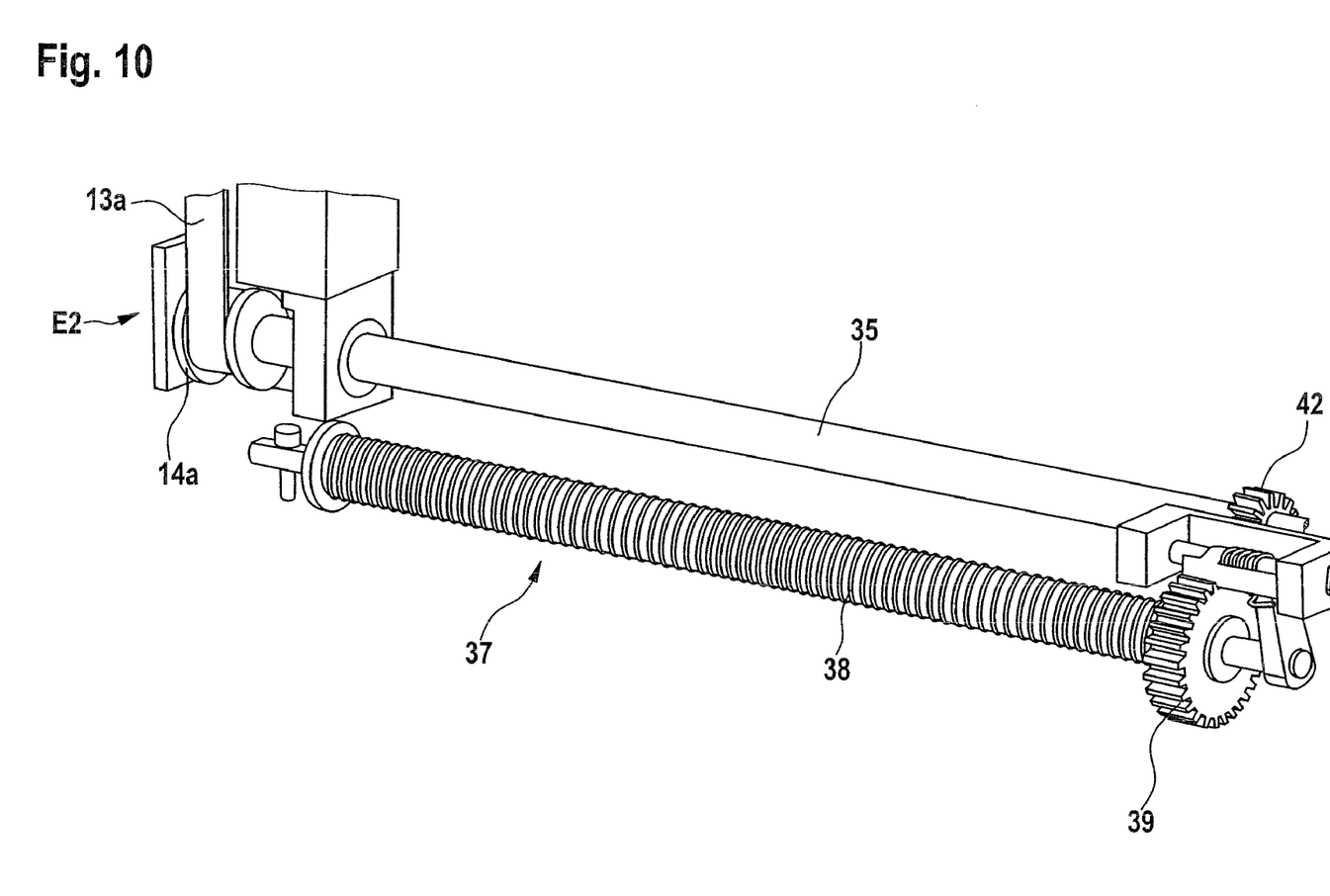
Figure 11:
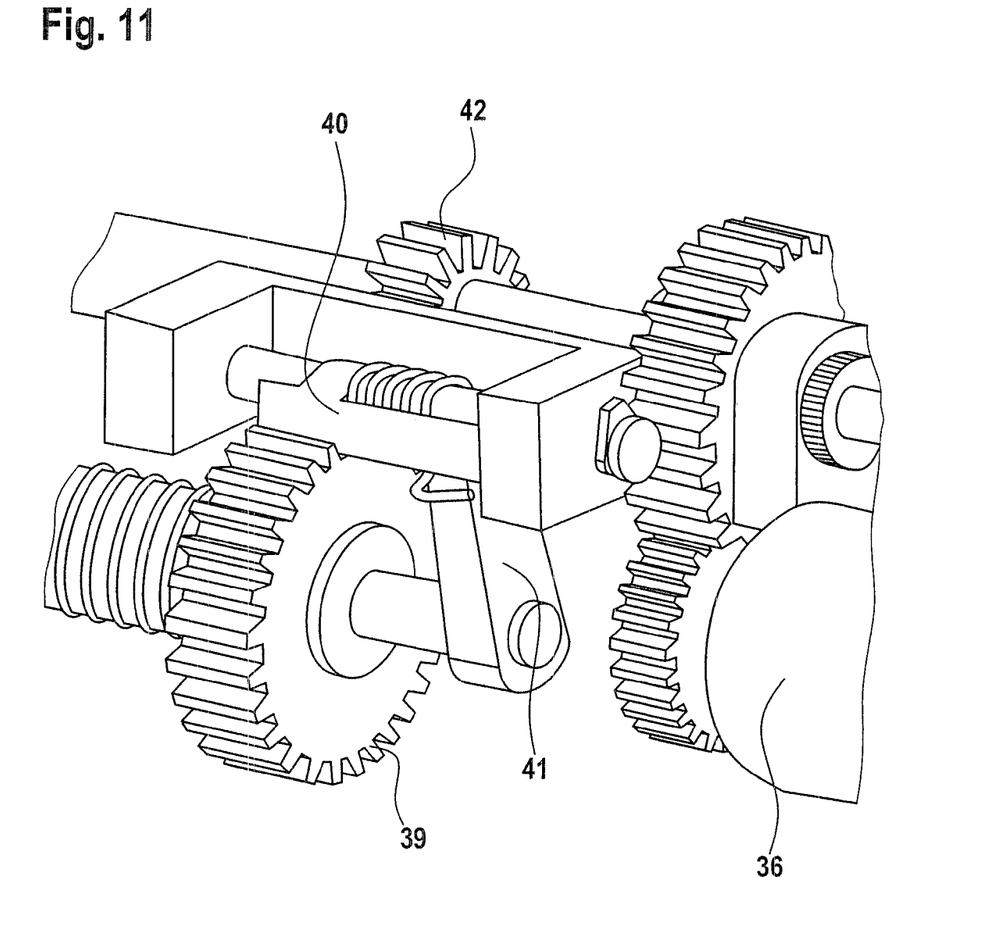
FIG. 11 shows a view of a detail as per FIG. 10.

FIGS. 10 and 11 show perspective views of essential components of a further pull-back device. In the exemplary embodiment shown here, the second toothed belt pulley 14a is attached to a lower drive shaft 35. The lower drive shaft 35 can be driven via a single third electric motor 36. Force can be transmitted here via gearwheels. The designation 37 refers to a pull-back shaft which is rotatable counter to the elastic force of a further torsion spring 38. A first gearwheel 39 in which a blocking pawl 40 engages is fastened to the one end of the pull-back shaft 37. The pull-back shaft 37 is movable parallel to the lower drive shaft 35 by means of a pivot lever 41 such that the first gearwheel 39 can optionally be brought into engagement with a second gearwheel 42 which is fastened on the lower drive shaft 35. In this case, a blocking pawl device comprising the blocking pawl 40 is configured in such a manner that the blocking pawl 40 is moved away out of the region of action of the first gearwheel 39 as soon as the latter is in engagement with the second gearwheel 42. At the same time, the third electric motor 36 can be decoupled with respect to the lower drive shaft 35. Only a lower, left part of the device is shown in FIG. 10. A similarly configured, further pull-back device can be provided in a lower, right part (not shown here). In particular, a further lower drive shaft which is driven by a fourth electric motor can be provided. Furthermore, a further pull-back shaft which corresponds to the further lower drive shaft and has a blocking pawl device can be provided. A further pull-back device of this type can serve to pull back the second shading means.

The operation of the device is explained in more detail below.

Winding Up and Unwinding the First Shading Means

In order to unwind the first shading means 6, the first electric motor 15 is coupled to the first toothed belt pulley 14a via the first coupling 16. A rotational movement of the first electric motor 15 rotates the drive shaft 11 via the first toothed belt 13a. The first displacement bar 17, which is fixedly connected to the first toothed belts 13a, 13b, is moved along the guide rails 3, 4. During a movement of the first displacement bar 17 in the direction of the second crosspiece 2, the first shading means 6 is unwound from the winding shaft 9. In the process, a winding radius decreases continuously, as a result of which the winding shaft 9 rotates increasingly more rapidly relative to the drive shaft 11—which is rotated at a constant speed. The relative rotational movement of the winding shaft 9 acts counter to the force of the torsion spring 10 such that, as the unwinding length of the first shading means 6 increases, an increasing prestress is produced. During the opposed winding-up movement of the winding shaft 9, said prestress serves to rotate said winding shaft in the same direction of rotation relative to the drive shaft 11, but at a rotational speed which partially differs therefrom. It is therefore advantageously ensured that the first shading means 6 is always kept tensioned during the winding-up and unwinding operations. A different rotational speed of the winding shaft relative to the drive shaft, caused by a change in the winding radius during the winding-up and unwinding operations, can therefore be compensated for.

Retraction and Extension of the Second Shading Means

The second shading means 7 is folded in the manner of an accordion and is supported by the second displacement bar 19. In order to extend and retract the second shading means 7, a simple displacement movement of the second displacement bar 19, which is likewise guided in the guide rails 3, 4, suffices. For this purpose, the second displacement bar 19 is driven via second toothed belts 30a, 30b, which are guided via the third toothed belt pulleys 29a, 29b, by means of the second electric motor 19 and the fourth toothed belt pulleys 32 which are connected in terms of drive thereto via the second coupling 31.

Pull-Back Device

In the event of a power failure, a pull-back device can be used to automatically wind up the first shading means 6 and to automatically retract the second shading means 7. For this purpose, the motor slides 28a, 28b, which are forced into the coupled-in state by the action of the compression springs 33a, are interconnected by a cable pull 34. Actuation of the actuating lever 8 shortens the cable pull 34. As a result, the motor slides 28a, 28b are moved towards each other and are therefore uncoupled in relation to the respective toothed belt pulleys. At the same time, a latching brought about by the latching device 26, 27 is released. The towing slide 21, which is connected to the tension spring 25 via the block and tackle 22, 23, 24, is moved by the action of the tension spring 25 in the direction of the first end E1 of the guide rail 4. In the process, the towing slide 21 tows the second displacement bar 19 by means of the second guide means 20, and the first displacement bar 17 by means of the first guide means 18, back into their initial position. In the process, the first shading means 6 is wound up onto the winding shaft 9 and the second shading means 7 is retracted.

In the alternative, further pull-back device shown in FIGS. 10 and 11, the pull-back shaft 37 is coupled into the lower drive shaft 35 in order to produce and accumulate a resetting force. The third electric motor 36 is subsequently operated until the first shading means 6 has been substantially unwound from the winding shaft 9. The further torsion spring 38 is tensioned in the process. Subsequently, a further actuating device (not shown specifically in FIGS. 10 and 11) is used to bring the blocking pawl 40 into engagement with the first gearwheel 39 such that a rotational movement of the pull-back shaft 37 is blocked. The tensioning force received in the further torsion spring 38 is therefore accumulated. The pull-back shaft 37 is subsequently pivoted such that the blocked first gearwheel 39 and the second gearwheel 42 are no longer in engagement, i.e. the pull-back shaft 37 is decoupled.

In order to actuate the further pull-back device, the further actuating device (not shown here) is used to pivot the pull-back shaft 37 in the direction of the lower drive shaft 35 until the first gearwheel 39 is in engagement with the second gearwheel 42. The blocking pawl 40 is subsequently pulled out of the region of action of the first gearwheel 39. The force accumulated in the further torsion spring 38 is therefore released. A torque is applied to the lower drive shaft 35 by the winding shaft 9 and therefore the winding shaft 9 is driven via the first toothed belts 13a, 13b in such a manner that the shading means 6, 7 is pulled in the direction of the winding shaft 9. The further torsion spring 38 here is expediently dimensioned in such a manner that the currentless third electric motor 36 can therefore also be rotated. In this case, a coupling between the third electric motor and the lower drive shaft 35 can advantageously be dispensed with.

The device proposed according to the invention is suitable not only for darkening cabin windows of aircraft, but also of motor homes, caravans, mobile homes, portholes of ships, or windows of residential buildings or motor vehicles.

LIST OF DESIGNATIONS

1 Upper crosspiece
2 Lower crosspiece
3 First guide rail
4 Second guide rail
4a Front wall
5 Aperture
6 First shading means
7 Second shading means
8 Actuating means
9 Winding shaft
10 Torsion spring
11 Drive shaft
12a, 12b First toothed belt pulleys
13a, 13b First toothed belts
14a, 14b Second toothed belt pulleys
15 First electric motor
16 First coupling
17 First displacement bar
18 First guide means
19 Second displacement bar
19a Second electric motor
20 Second guide means
21 Towing slide
22 Block and tackle
23 Lower block
24 Upper block
25 Tension spring device
26 Latching claw
27 Latching projection
28a, 28b Motor slide
29a, 29b Third toothed belt pulley
30a, 30b Second toothed belts
31 Second coupling
32 Fourth toothed belt pulley
33a, 33b Compression spring
34 Cable pull
35 Lower drive shaft
36 Third electric motor
37 Pull-back shaft
38 Further torsion spring
39 First gearwheel
40 Blocking pawl
41 Pivot lever
42 Second gearwheel
E1 First end
E2 Second end
L1 First bearing
L2 Second bearing
L3 Third bearing

What is claimed is:

1. A device for darkening a cabin window, comprising:
   a drive shaft for moving a first shading means, the first shading means being moveably guided by two guide rails, wherein the drive shaft and the two guide rails are combined in a common mounting unit;
   at least one first drive strap for driving the drive shaft and being fixedly connected to a first displacement bar, the ends of the first displacement bar being guided in the guide rails, an edge of the first shading means being attached to the ends;
   wherein the first drive strap is guided about a first strap pulley fixedly connected to the drive shaft and about a second strap pulley provided in the region of a first end of the guide rails and wherein the second strap pulley is selectively connectable to a first electric motor via a first coupling for driving the first drive strap;
   a pull-back device with a pretensionable spring for rolling up the first shading means;
   a towing slide provided in at least one of the guide rails between the first displacement bar and the first end of the guide rails, the towing slide being drawable back in the direction of a second end of the guide rails by the pull-back device;

wherein the towing slide comprises a latching device for latching the towing slide in a latched position, the latching device being fixedly attached to a first motor slide on which the first electric motor is slidably held, the latching device being provided proximate the first end of the guide rails.

2. The device according to claim 1, wherein the mounting unit comprises a frame which is formed from the guide rails and an upper crosspiece and a lower crosspiece connecting the guide rails.

3. The device according to claim 2, wherein the mounting unit has a front wall attached to the frame and an opposite rear wall, and wherein the front wall and the rear wall each have an aperture corresponding to the shape of the cabin window.

4. The device according to claim 1, further comprising a winding shaft which is drivable by the drive shaft for rolling up and unrolling the first shading means formed by a substantially rectangular blank.

5. The device according to claim 4, wherein the winding shaft comprises a hollow shaft and, with the interconnection of an elastic resetting means, is held rotatably on the drive shaft which is located in proximity with the second end of the two guide rails.

6. The device according to claim 5, wherein the elastic resetting means comprises a spring.

7. The device according to claim 6, wherein said spring comprises a torsion spring.

8. The device according to claim 1, wherein the second strap pulley is attached to a lower drive shaft which is driven by the first electric motor.

9. The device according to claim 1, wherein the pull-back device comprises a pull-back shaft which is selectively couplable into a lower drive shaft.

10. The device according to claim 9, wherein the pull-back device comprises a further torsion spring which is held on the pull-back shaft, and a selectively actuable blocking device for blocking a rotational movement of the pull-back shaft in the decoupled state.

11. The device according to claim 1, wherein the spring is pretensionable via a block and tackle.

12. The device according to claim 1, wherein the guide rails comprise double guide rails which comprise a second displacement bar, an edge of a second shading means being attached to the second displacement bar.

13. The device according to claim 1, further comprising at least one third strap pulley provided on said drive shaft, the at least one third strap pulley being rotatable relative to the drive shaft, and a second drive strap being guided about the at least one third strap pulley, the second drive strap being fixedly connected to the second displacement bar.

14. The device according to claim 13, further comprising a fourth strap pulley for driving the second drive strap proximate one of the first ends of the double guide rails, said strap pulley being selectively connectable to a second electric motor via a second coupling.

15. The device according to claim 1, wherein the towing slide is provided between the second displacement bar and the first end of the guide rails.

16. The device according to claim 14, further comprises a release device for decoupling the first electric motor and/or the second electric motor.

17. The device according to claim 16, wherein at least the first electric motor and the latching device, which keeps the towing slide in the latching position, are simultaneously decoupable by the release device.

* * * * *